Patented May 13, 1952

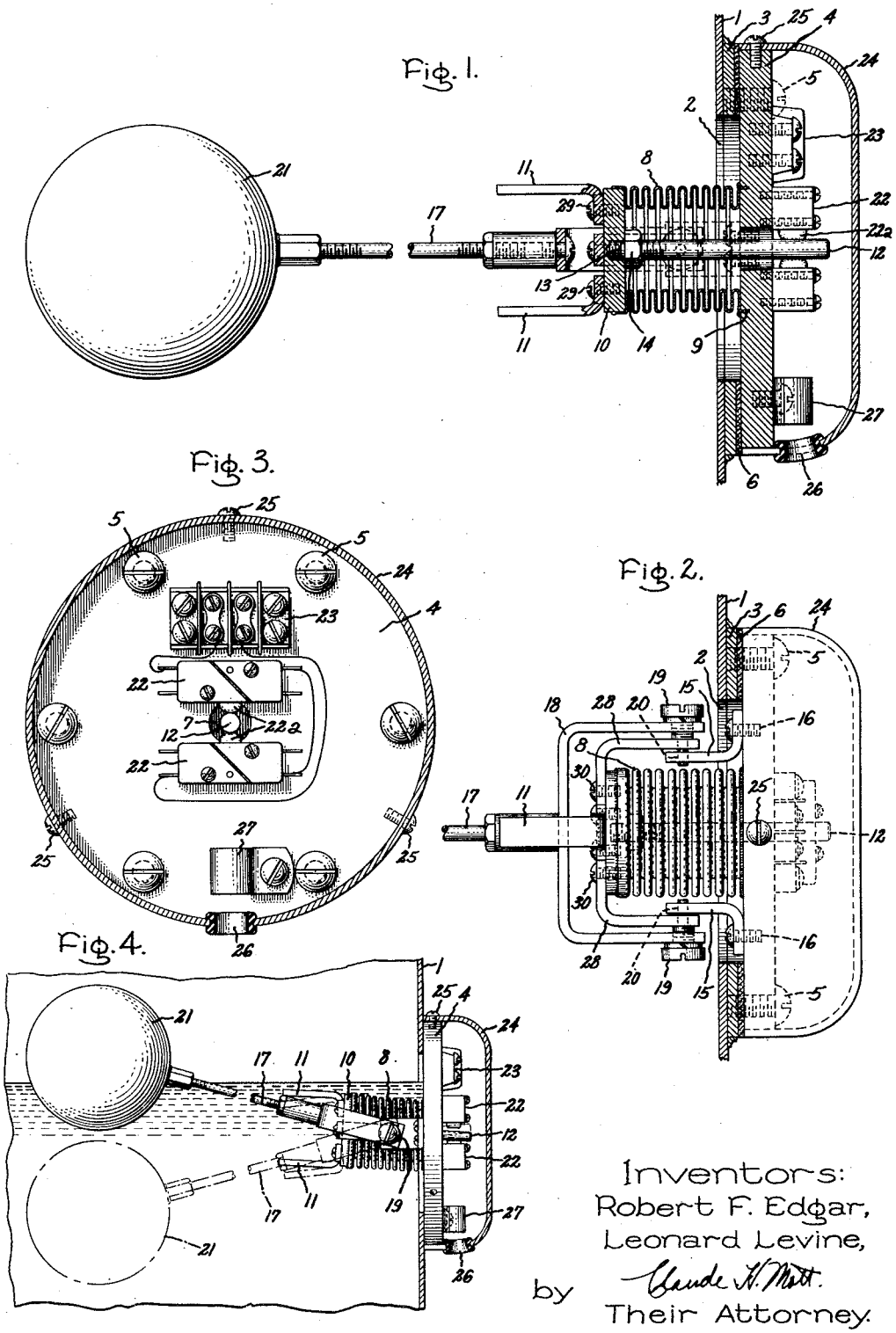

2,596,666

UNITED STATES PATENT OFFICE 2,596,666

FLOAT DEVICE

Robert F. Edgar, Pattersonville, and Leonard Levine, Albany, N. Y., assignors to General Electric Company, a corporation of New York Application May 5, 1949, Serial No. 91,526

8 Claims. (Cl. 200—84)

This invention relates to float devices, and more particularly to float devices which are used to operate electric switches responsively to the level of a fluid in a gravity tank.

The principal object of the invention is to provide a device having a float within a tank which operates externally located electric switches at a predetermined high fluid level and a predetermined low fluid level in the tank.

A further object of the invention is to provide such a device having an operating mechanism connecting the float and the external switches through the wall of the tank which is sealed to prevent the escape of fluid from the tank.

A still further object of the invention is the provision for such a float device of a fluid seal utilizing a metal bellows in which the minimum amount of stress and flexing is imposed on the bellows.

In carrying out our invention in one form, we provide a tank having an opening in a wall thereof. A mounting plate, having an aperture in it is affixed to the outside surface of the tank covering the opening in the tank. A pair of supports extend inwardly into the tank from the mounting plate on horizontally opposite sides of the aperture in the plate. A lever having a float on the free end is pivoted on these supports. A metal bellows having its open end sealed to the mounting plate around the aperture in the plate extends inwardly into the tank between the supports. The inner end of the bellows, which is closed, is connected to the same supports by means of a suitable yoke in a manner such that the inner end of the bellows is pivoted about the approximate natural center of deflection of the bellows, which minimizes the strain on the bellows when it is deflected from its normal position. A pair of inwardly extending prongs are provided on the inner surface of the closed end of the bellows. A rigidly connected operating rod is provided on the under side of the closed end of the bellows which extends outwardly through the bellows and through the aperture in the mounting plate. When the lever is pivoted a predetermined amount upward or downward, corresponding to selected high and low fluid levels in the tank, the lever engages one of the prongs on the inner end of the bellows. This causes the inner end of the bellows to pivot which causes the operating rod to be displaced. The displacement of the operating rod operates one of two electric switches located on the outside surface of the mounting plate.

For a more complete understanding of our invention, reference should be had to the accompanying drawing, Fig. 1 of which is a side view, partially in section, of a preferred embodiment of the invention; Fig. 2 is a partial top view of this embodiment of the invention; Fig. 3 is a cutaway view showing the outer surface of the mounting plate; while Fig. 4 is a side view illustrating the upper and lower switch operating positions of the device.

Referring to Fig. 1 of the drawing, the numeral 1 designates a metal wall of a tank which is provided with an opening 2 through which the float device is inserted in the tank. To strengthen the wall of the tank near opening 2, an annular metal ring 3 is secured to the tank 1 in a suitable manner, such as by welding, around opening 2 on the outer surface of the tank. A circular metal mounting base 4 for the float device is secured to member 3 by machine screws 5, or other suitable means, with a gasket 6 preferably being provided between members 3 and 4. Mounting base 4 has an aperture 7 located substantially at the center of the base, as seen best in Fig. 3 of the drawing.

Extending inwardly into the tank from base 4 is a metal bellows or other flexible sealing means 8. The outermost end of the metal bellows has a circular projection 9 which engages a corresponding circular recess in mounting base 4 and is securely joined to base 4 in a suitable manner, such as by soldering. The inner end of bellows or flexible sealing means 8 is equipped with a circular metal disc 10 which is securely joined to the bellows by soldering or other suitable means. A pair of prongs 11 are positioned in spaced-apart relation near the upper and lower edges of disc 10, extending horizontally inward into the tank. Prongs 11 are secured to disc, or closure member 10 by machine screws 29 or other suitable means. On its outermost surface, the disc 10 is equipped with a rod 12 which extends outwardly through the bellows and through aperture 7 in base 4. Rod 12 is located approximately in the center of disc 10 and is rigidly secured to the disc by means of a threaded portion 13, which engages a corresponding internally threaded portion within disc 10, and a lock nut 14.

On opposite sides of bellows 8, as best seen in Fig. 2 of the drawing, the base 4 of the float device is provided with a pair of supports 15. Supports 15, which are at substantially the same vertical level on the tank wall, provide for pivoting both a float member and the inner end 10 of the bellows member 8 about the transverse line intermediate the ends of the bellows member, and extending preferably through the natural center of deflection of the bellows. The natural center of deflection of the bellows 8 is defined as approximately the intersection of the central perpendicular to the ends of the bellows when the movable end is deflected from its normal unstressed position. Thus the natural center of deflection is intermediate the ends of the bellows on the central perpendicular to the fixed end. Its exact position on this line varies slightly with the amount of deflection. However for small deflections of the magnitude encountered in the practice of this invention, such variation is inconsequential. Supports 15 extend horizontally inward into the tank and are secured to mounting base 4 by means of screws 16 or other suitable means. The float device is provided with a lever 17 which is pivotally mounted on supports or fulcrum members 15. The lever 17 has a clevis-like bifurcated portion 18 at one end which has a pair of pivot pins 19 threaded into openings near the extremities of the clevis portion. The inner reduced diameter portions of pivot pins 19 are journaled in axially aligned openings 20 in supports 15. The inner reduced diameter portions of pivot pins 19 also provide pivots for a U-shaped yoke 28, the bight portion of which is attached by screws 30 or other suitable means to the metal disc 10, so that a fixed pivot point is provided for this disc and the inner end of the bellows. The opposite end of lever 17 is provided with a float 21, forming a float member which is responsive to the level of the fluid in the tank.

Externally of the tank, as best seen in Fig. 3 of the drawing, the float device is equipped with a pair of electric snap switches 22 which are positioned on base 4 in vertically spaced relation on opposite sides of aperture 7. Switches 22, as shown in Fig. 3, represent snap switches requiring a small actuating force and a small movement of the actuating means for their operation, such as are illustrated and claimed in the Patent No. 2,332,911 to Hausler, for example; however, simple contacts or other suitable switching means may also be used. Each switch 22 has an operating member 22a which is in contact with operating rod 12 when the rod is in its normal quiescent position. As shown in Fig. 3, the switches 22 are represented as normally closed devices which are connected in series to the center terminals of a terminal board 23. With this arrangement, if either of switches 22 is opened, the circuit is broken. It will be readily understood, however, that switches 22 may be arranged to operate separate electrical circuits, and further that the switches may be made either normally closed or normally open, and a plurality of contacts may be provided on either or both switches, without departing from the spirit of our invention. In this embodiment of our invention, mounting plate 4 is provided with a cover 24 which is secured to the outer periphery of the mounting plate 4 by means of screws 25. At the bottom of the cover 24 there is provided an opening 26 for bringing electrical leads into the enclosure formed by the cover to connect them to terminal board 23, and a clamp 27 is provided on mounting base 4 for these leads.

The manner in which the float device of our invention operates is illustrated by Fig. 4 of the drawing. The upper position of float 21 in this figure corresponds to a predetermined upper fluid level in the tank. When the fluid in the tank reaches this upper level lever 17 is pivoted upwardly sufficiently that it engages the upper prong 11 on disc 10. This causes the inner end of bellows 8 to be pivoted upward and simultaneously causes rod 12 to be displaced from its normal substantially horizontal position. Since the disc 10 at the inner end of the bellows is pivoted upward and rod 12 is rigidly affixed to this disc, the outer extremity of rod 12 pivots downward which moves the switch operating member 22a and operates the lower switch 22. When the fluid level in the tank reaches a predetermined low point, as indicated by the dotted lines in Fig. 4, lever 17 engages the lower prong 11. This causes the inner end of bellows 8 to be pivoted downward and, in turn, causes operating rod 12 to actuate the upper switch 22 on the outside of mounting base 4.

During normal periods, the fluid level in the tank is between the upper and lower limits illustrated by Fig. 4, and during such normal periods there is no contact between lever 17 and the prongs 11. Therefore, bellows 8 is normally at rest without force being exerted upon it either upward or downward. This, of course, is a great advantage because the bellows is the part most susceptible to wear in a device of this type. Furthermore, the fulcrum about which lever 17 and the inner end of bellows 8 are pivoted is located at the natural center of deflection of the bellows so that there is a minimum of strain in the bellows when deflection does occur.

A further advantage of our invention is that a single bellows is used to provide for the operation of electric switches at both high and low fluid levels. In addition, the bellows provides a means for effectively sealing the device to prevent fluid within the tank from coming in contact with the electric switches externally of the tank.

While we have illustrated and described one preferred embodiment of our invention, modifications thereof will occur to those skilled in the art; therefore, it should be understood that we intend to cover, by the appended claims, all such modifications as fall within the true spirit and scope of our invention.

What we claim as new and desire to secure by Letters Patent of the United States is:

1. A float device comprising a mounting base attachable to a wall of a tank, a pair of inwardly extending supports positioned on said base, a floatable member pivoted on said supports, a flexible bellows member positioned on said mounting base between said supports and having a closed inner end, a yoke having its bight portion fastened to said inner end of said bellows and its legs pivotally mounted on said supports, a pair of inwardly extending prongs positioned in spaced-apart relationship on the inner end of said bellows in operative relation with said floatable member, and a rod rigidly positioned on the opposite surface of said inner end and extending outwardly through said bellows.

2. A float device comprising a mounting plate attachable to a wall of a tank, a pair of supports positioned on said plate extending into said tank, a floatable member having a bifurcated portion on one end pivoted on said supports, a tubular flexible sealing member positioned on said plate between said supports extending into said tank, the inner end of said tubular member being closed, a yoke embracing said inner end and having the bight portion of said yoke connected thereto, the leg portions of said yoke being pivotally connected to said supports, a pair of prongs positioned on said inner end and extending inwardly therefrom in operative relation with said floatable member, an operating rod rigidly positioned substantially centrally of said inner end on the outer surface thereof and extending outwardly through said tubular member and said mounting plate, and a pair of electric switches positioned on the outside of said plate on opposite sides of said rod in operative relation therewith.

3. In a gravity float device, the combination with a tank having an opening in one wall, of a mounting base positioned on the outside of said tank covering said opening, said base having an aperture therethrough, a pair of supports positioned on horizontally opposite sides of said aperture extending inwardly from said base through the opening in said tank, a floatable member having a bifurcated portion at one end positioned within said tank, the extremities of said bifurcated portion being pivotally connected to said supports whereby said floatable member is pivoted in a vertical plane on said supports, a metal bellows member positioned on said base around said aperture between said supports and extending substantially horizontally inward into said tank, a circular disc closing the inner end of said bellows member whereby the escape of fluid from the tank is prevented, a yoke member positioned on said disc and pivotally connecting said disc to said supports, a pair of inwardly extending substantially horizontal prongs positioned on the innermost surface of said disc in operative relation above and below said floatable member whereby when said floatable member is pivoted a predetermined amount responsively to the level of a fluid in the tank said member engages one of said prongs and pivotally deflects the inner end of said bellows member away from its normal substantially horizontal position, an operating rod rigidly positioned on the outer surface of said disc substantially centrally thereof and extending outwardly through said bellows member and said aperture, and a pair of electric switches positioned on the outside of said base on vertically opposite sides of said aperture in operative relation with said rod whereby when the inner end of said bellows member is deflected away from its normal substantially horizontal position said rod is displaced and operates one switch for a predetermined low fluid level in the tank and the other for a predetermined high fluid level in the tank.

4. In a gravity tank having an opening in a wall thereof, a float device comprising a plate closing said opening, said plate having an aperture therethrough, a metal bellows having an open end whose margins are sealed to said plate and surround the aperture in said plate, said bellows having a closed end projecting into said tank, a pair of fulcrum members positioned on said plate and projecting into said tank on opposite sides horizontally of said bellows, a lever having a bifurcated end pivotally mounted on said fulcrum members for pivotal movement about an axis passing approximately through the natural center of deflection of said bellows, a float responsive to the level of fluid in said tank positioned on the free end of said lever, a pair of prongs positioned on the closed end of said bellows and projecting inwardly into said tank in operative relation with said lever whereby the lever engages one of said prongs when the fluid in said tank reaches a predetermined level, a yoke member affixed to the inner surface of said closed end and pivotally connected to said fulcrum members for pivotal movement about an axis passing approximately through the natural center of deflection of said bellows, an operating rod rigidly positioned substantially in the center of the outer surface of said closed end and extending outwardly through said bellows and the aperture in said plate, and a pair of electric switches positioned on the outer surface of said plate in operative relation with said rod whereby when the fluid in the tank reaches a predetermined high level said lever engages one said prong, causing the inner closed end of said bellows to pivot, thereby displacing said rod and causing it to operate one of said switches, and when the fluid in the tank reaches a predetermined low level said lever engages the other said prong, causing the inner closed end of said bellows to pivot, displacing said rod in the opposite direction and causing it to operate the other of said switches.

5. A float device comprising mounting means attachable to a wall of a tank having an opening therein, a flexible tubular member provided with a closed inner end affixed to said mounting means and extending inwardly into the tank, a floatable member fulcrumed on a transverse axis of said flexible member passing approximately through the natural center of deflection of said flexible member, and means positioned on the inner surface of said closed inner end in operative relation with said floatable member for deflecting said flexible member at an extreme travel position of said floatable member, and an elongated operating member positioned on the outer surface of said inner closed end and extending outwardly through said bellows and the opening in said tank.

6. A float device comprising a flexible bellows member arranged for attachment to a side wall of a tank extending into the tank in horizontally disposed position, said bellows member having a closed inner end and a center of deflection intermediate its ends, a float member pivotally connected to said wall for rotational movement about a transverse axis of said bellows member passing approximately through said center of deflection, engaging means on the inner surface of said inner end for engaging said float member at a predetermined position thereof, and an operating rod positioned on the outer surface of said inner end and extending outwardly through said bellows member.

7. A float device comprising a flexible bellows member arranged for attachment to a side wall of a tank extending into the tank in horizontally disposed position, said bellows member having a closed inner end and a center of deflection intermediate its ends, a float member pivotally connected to said wall at a location adjacent the sides of said bellows member, said float member being pivoted about a transverse line extending approximately through said center of deflection, connecting means joined to said inner end pivoting said end about said line, engaging means on the inner surface of said inner end for engaging said float member at a predetermined position thereof, and an operating rod positioned on the outer surface of said inner end and extending outwardly through said bellows member.

8. A float device comprising mounting means attachable to a wall of tank, a pair of inwardly extending supports positioned on said mounting means, a floatable member pivoted on said supports, a flexible bellows member positioned on said mounting means between said supports and having a closed inner end, a yoke having its bight portion fastened to said inner end of said bellows member and its legs pivotally mounted on said supports, engaging means positioned on the inner end of said bellows in operative relation with said floatable member, and a rod positioned on the opposite surface of said inner end and extending outwardly through said bellows.

ROBERT F. EDGAR.
LEONARD LEVINE.

REFERENCES CITED

The following references are of record in the file of this patent:

UNITED STATES PATENTS

| Number | Name | Date |
|---|---|---|
| 1,962,221 | Van Valkenburg et al. | June 12, 1934 |
| 2,076,547 | Carlson | Apr. 13, 1937 |
| 2,220,144 | Carlson | Nov. 5, 1940 |
| 2,255,732 | Kronmiller | Sept. 9, 1941 |

FOREIGN PATENTS

| Number | Country | Date |
|---|---|---|
| 343,909 | Great Britain | Feb. 12, 1931 |
| 828,796 | France | Feb. 28, 1938 |